Figure 1:
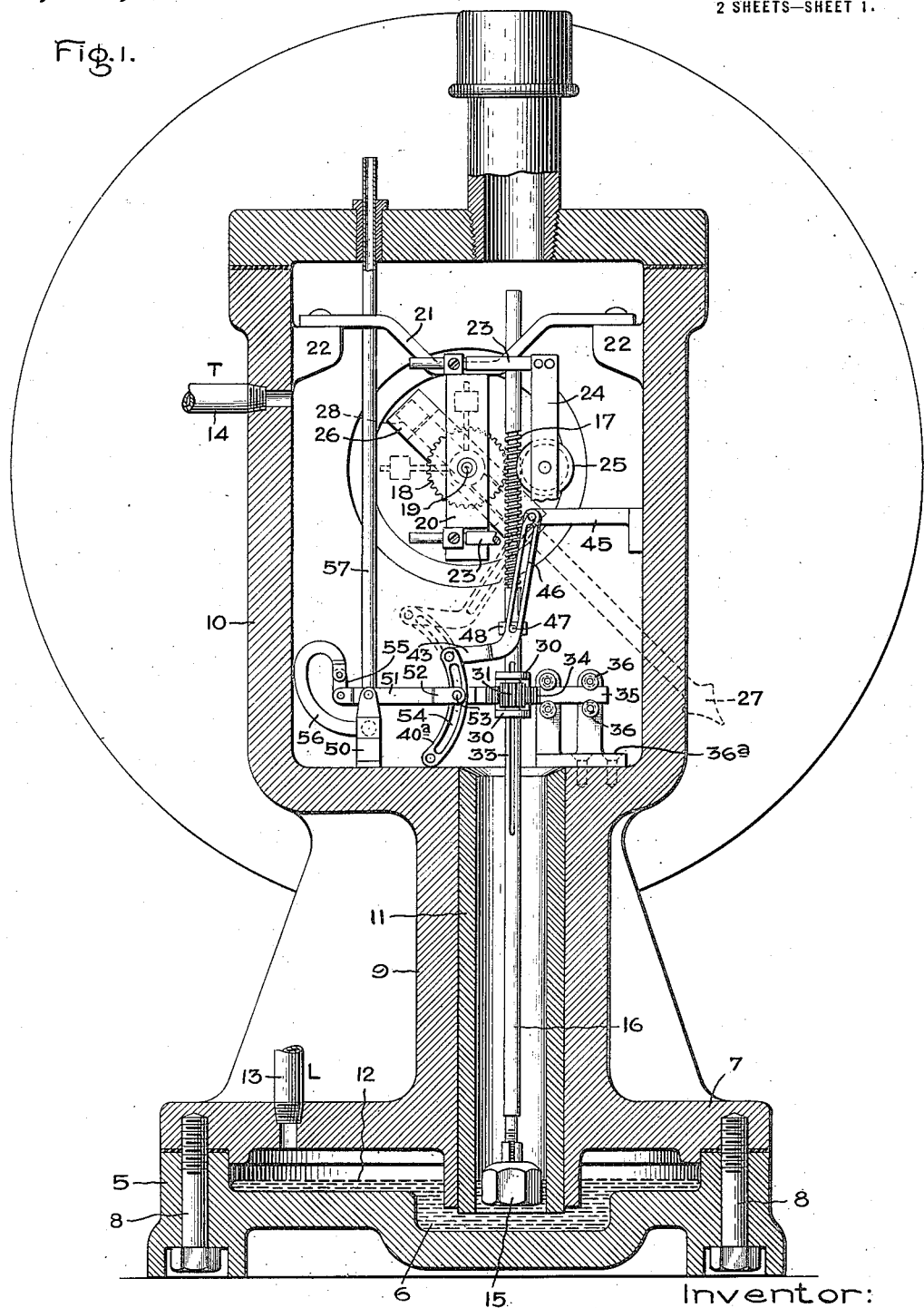

C. F. BULLOCK.
FLOW METER.
APPLICATION FILED MAR. 14, 1917.

1,281,906.

Patented Oct. 15, 1918.
2 SHEETS—SHEET 1.

Inventor:
Charles F. Bullock,
by Albert G. Davis
His Attorney.

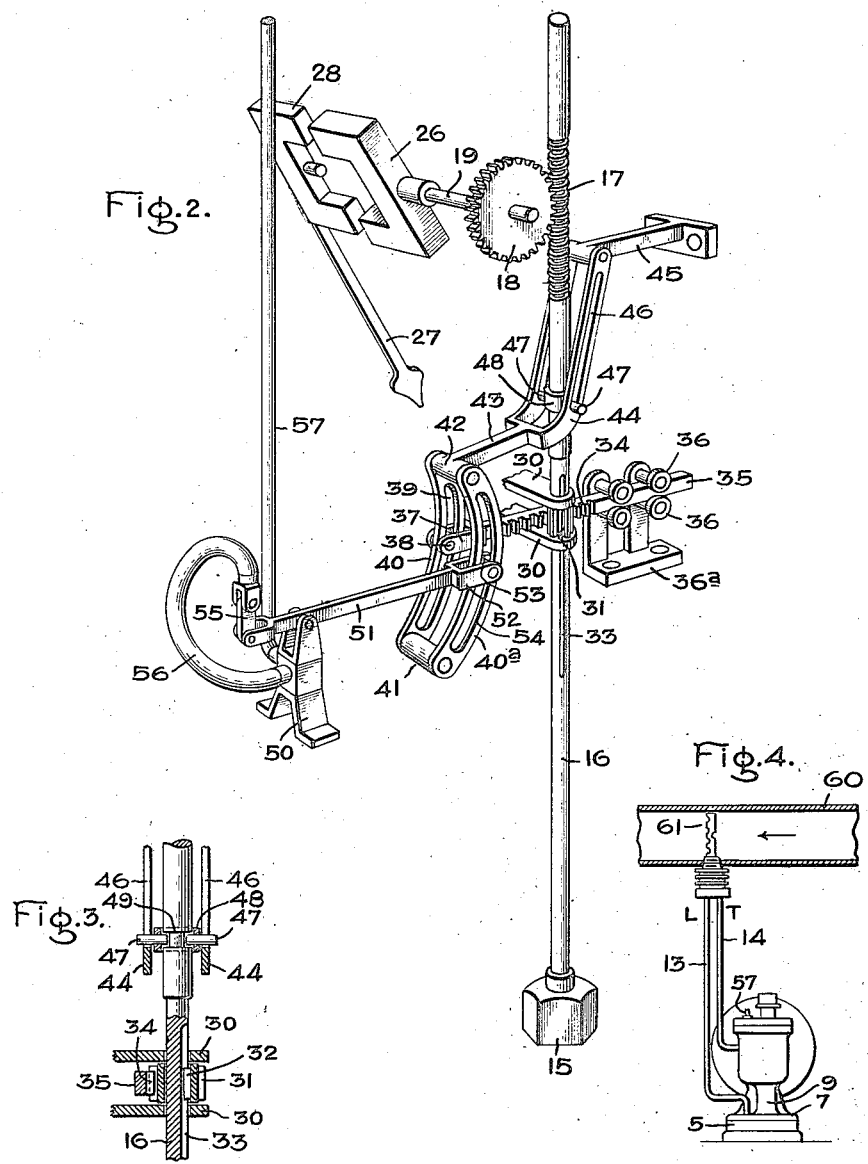

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

FLOW-METER.

1,281,906.  Specification of Letters Patent.  Patented Oct. 15, 1918.

Application filed March 14, 1917. Serial No. 154,852.

*To all whom it may concern:*

Be it known that I, CHARLES F. BULLOCK, a citizen of the United States, residing at Schenectady, in the county of Schenectady, State of New York, have invented certain new and useful Improvements in Flow-Meters, of which the following is a specification.

The present invention relates to flow meters of the U-tube type, that is, flow meters comprising a U-tube having an indicating liquid therein and having its two legs above the liquid connected to a suitable pressure difference creating device, as a Venturi tube, a Pitot tube, or the like. As is well known, the deflection of the indicating fluid in a U-tube set up by a pressure difference creating device is indicative of the velocity of flow of the fluid being metered and from this can be calculated the quantity of flow, the conditions of the fluid being metered, as its temperature, pressure, etc., being taken into consideration. If the conditions of the fluid being metered remain constant, then the deflections of the indicating fluid in the U-tube are an indication of the quantity of flow, and a scale plate may be laid off accordingly which will read correctly for these conditions. If any of the conditions vary, however, then the reading must be corrected for such variations.

The object of my invention is to provide an improved meter of the U-tube type which will automatically correct for variations in a condition or conditions of the fluid being metered.

For a consideration of what I believe to be novel and my invention, attention is directed to the accompanying specification and the claims appended thereto.

In the accompanying drawing, Figure 1 is a vertical section through a meter embodying my invention; Fig. 2 is a detailed perspective view of the moving parts thereof; Fig. 3 is a view partly in section of a detail; and Fig. 4 shows the meter connected with a conduit through which the fluid to be metered flows.

Referring to the drawing, 5 indicates a base having a well 6 therein, and 7 a cover plate fastened to the base 5 by bolts 8. Projecting vertically from the cover 7 is a tube 9 which terminates in an enlarged casing 10. Within the tube 9 is a filling tube 11 which determines the cross-sectional area of the bore. The well 6 and tube 9 form a well known type of U-tube, the leading pressure being brought into the well 6 above the indicating fluid 12 therein by a pipe 13, and the trailing pressure being brought into the tube 9 by the pipe 14. As the pressures set up by the pressure difference creating device vary, the level of fluid 12 in the tube 9 varies. Riding on the surface of the fluid 12 in tube 9 is a float 15 carried by a stem 16 having a thread 17 on its upper end. Meshing with thread 17 is a gear wheel 18 mounted on a shaft 19 journaled in suitable bearings in a bracket 20, which bracket is carried by a strap 21 supported on lugs 22 on casing 10. Carried by bracket 20 are two spaced rods 23 connected by plates 24 between which is journaled a grooved wheel 25 which engages the stem 16 on a side opposite to the gear wheel 18. The wheel 25 serves to hold the thread 17 in mesh with the gear wheel 18 and also to guide the stem 16 in its movements. Connected to shaft 19 is a suitable mechanism for indicating the movement of the float 15, and in the present instance it is shown as comprising a permanent magnet 26 connected to the shaft, which transmits the turning movement of the shaft to a pointer 27, the transmission being effected through a second magnet 28 carried on the same shaft as the pointer, this being a well known arrangement.

Supported by the casing 10 are two spaced plates 30 having openings through which the stem 16 freely passes. On the stem 16 between plates 30 is a gear wheel 31. The opening through the gear wheel 31 is sufficiently large to permit the stem 16 to slide freely through it. In the gear wheel 31 is a feather 32 which engages in a groove 33 in the stem 16. The stem 16 can thus move vertically independently of the wheel 31, but may be turned by a rotation of such wheel, due to the feather 32 engaging in groove 33. Meshing with the gear wheel 31 is a rack 34 on a bar 35. One end of bar 35 is guided by rollers 36 carried by a bracket 36ª on casing 10, and the other end is forked, as indicated at 37, and between the arms is a roller 38 which engages in a curved slot 39 in a curved arm 40 which forms one of a pair of curved arms 40 and 40ª. The curved arms 40 and 40ª are pivoted at one end to a cross piece 42 on the end of a bar 43 and are fastened together at their other ends by a suitable rivet 41. The arms 40 and 40ª thus form in substance a single lever, one end of which is pivoted on cross piece 42 and the other end of which is free. The bar 43 has a forked end 44 pivoted on a fixed bracket 45. The two arms of the forked end 44 of bar 43 are provided with slots 46 into which project the outer ends of two pins 47 carried by a collar 48 surrounding the stem 16, the stem at the point where collar 48 is located being provided with an annular recess 49 into which the inner ends of pins 47 project. 50 indicates a fixed support upon which is pivoted a lever 51. One end of lever 51 is provided with a fork 52 within which is a roller 53 located in a curved slot 54 in the curved arm 40ª. The other end of lever 51 is connected by a link 55 to a device which is adapted to move in response to variations in a condition or conditions of the fluid being metered. In the present instance a pressure gage tube 56 is shown carried by fixed support 50. The inside of the gage tube 56 is in communication with the atmosphere through a pipe 57 and the outside is subjected to the pressure within casing 10, which is the trailing pressure. The gage tube 56 is, therefore, moved to tilt the lever 51 in accordance with the pressure of the fluid being metered.

It will be understood, of course, that any suitable type of device which moves with variations in a condition of the fluid being metered, as the pressure, may be used to tilt lever 51, the gage tube 56 being merely one example of such a device.

In Fig. 4 the flow meter is shown as being connected to a conduit 60 through which the fluid to be metered flows. 61 indicates a Pitot tube to which the leading and trailing pipes 13 and 14 are connected.

When the float 15 is moved due to variations in the level of the mercury 6, the rod 16 moves the threads 17 along the gear wheel 18, the threads then acting as rack teeth to turn the wheel. During this movement the rod 16 slides through the gear wheel 31. The turning of gear wheel 18 turns the shaft 19 and from this a similar turning movement is transmitted to the pointer 27 through magnets 26 and 28. When the bar 35 moves longitudinally, the rack 34 turns the gear wheel 31 and imparts a turning movement to the stem 16. This turns the threads 17 which act as a screw or worm to turn gear wheel 18, and hence position pointer 27 as already explained.

The arrangement of the parts is such that at no flow the pins 47 rest at the bottom of slots 46 and the curved arm 40ª occupies a position such that the curved slot 54 is on the arc of a circle having the pivot point of lever 51 as its center. When in these positions, therefore, representing no flow, changes in pressure do not affect the position of the indicating pointer 27 as the tilting of lever 51 merely moves the roller 53 in the slot 54 since this slot, as just pointed out, has the same center of curvature as the arc along which the roller 53 is moved. The scale plate of the meter is calibrated for some one pressure, which may be termed the normal pressure, and for this pressure, of course, the scale will indicate the flow correctly without any correction being made for pressure. The arrangement of the parts for this calibrated pressure is, therefore, such that for this pressure a movement of the float 15, and hence a shifting of bar 43 and curved arms 40 and 40ª, as indicated in dotted lines in Fig. 1, causes no movement of the bar 35 and rack 34. To this end the arrangement is such that for the calibrated pressure the center lines of the two rollers 38 and 53 coincide. This is the position of the parts in Fig. 1, and it will be clear that when in such position a change in either the pressure or in the flow will not affect the position of the bar 35.

In operation, if a change in the rate of flow of fluid through the conduit to which the meter is connected occurs, the pressure difference creating device 61 will set up a pressure difference which, acting on the liquid 12 in the U-tube, will cause the level to change in the tube 9. This will raise or lower the float 15 and push the threads 17 along the gear wheel 18, the threads then acting as a rack to turn the wheel, as already explained. When the stem 16 moves it carries with it the collar 48 and pins 47, and pins 47 in moving along the slots 46, which are inclined to the vertical, impart a swinging movement to bar 43, which in turn moves the lever arm comprising the curved arms 40 and 40ª. In this swinging movement the curved arms 40 and 40ª turn about the roller 53 on the end of lever 51 as a pivot, this roller being a fixed point, if, at the time, the pressure of the fluid being metered remains constant. If now the pressure is the normal or calibrated pressure, then the center line of the roller 38 is in axial alinement with the center line of the roller 53 and no movement of the bar 35 will take place. If, however, the pressure is other than the calibrated pressure, then the center lines of the two rollers 38 and 53 will not be in alinement, and as a consequence the turning of the lever arms 40 and 40ª about the roller 53 will impart a movement to the bar 35. This will cause the rack 34 to turn gear wheel 31 and impart a corrective movement of the pointer 27, as already explained.

If at any time the pressure changes, then the roller 53 will be moved up or down in the slot 54, and if at this time the flow is other than zero, the lever arm comprising the curved arms 40 and 40ª will be turned on the cross piece 42, thereby moving the bar 35 and turning the gear wheel 31 which, as already explained, will impart the desired movement to the pointer 27.

It will thus be seen that in the specific embodiment of my invention illustrated and described, the variation in the flow due to changes in pressure will be accurately corrected for. As already stated, however, I may utilize my invention to correct for variations in any other condition or conditions of the fluid being metered.

The threads 17 are of a suitable pitch to produce the desired movements, and, as is clear, they act in the one instance as a rack and in the other as a screw or worm in imparting movement to the gear wheel 18.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. The combination with a conduit through which a fluid to be metered flows, of a pressure difference creating device therein which creates a pressure difference which bears a definite relation to the rate of flow, a pressure responsive mechanism connected therewith, a member to which said mechanism imparts a reciprocating movement, means responsive to a condition of the fluid being metered for imparting to said member an oscillatory movement about its vertical axis, an indicating device, and means for transmitting said movements to the indicating device.

2. The combination with a conduit through which a fluid to be metered flows, of a pressure difference creating device therein which creates a pressure difference which bears a definite relation to the rate of flow, a pressure responsive mechanism connected therewith, a member to which said mechanism imparts a vertical movement, means responsive to the pressure of the fluid being metered for imparting to said member a turning movement about its vertical axis, an indicating device, and means for transmitting said movements to the indicating device.

3. In a flow meter, the combination of a U-tube having an indicating fluid therein, a float which rides on the indicating fluid whereby it is given a vertical movement, means actuated by variations in a condition of the fluid being metered for giving said float a turning movement, an indicating pointer, and means for transmitting said vertical movement and said turning movement to the indicating pointer.

4. In a flow meter, the combination of a U-tube having an indicating fluid therein, a float which rides on the indicating fluid whereby it is given a vertical movement, means actuated by the pressure of the fluid being metered for giving said float a turning movement, an indicating pointer, and means for transmitting said vertical movement and said turning movement to the indicating pointer.

5. In a flow meter, the combination of a U-tube having an indicating fluid therein, a float which rides on the indicating fluid whereby it is given a vertical movement, a stem on the float having a screw-thread thereon, a gear wheel engaging said screw-thread whereby the wheel may be turned by a vertical movement of the float, a pressure actuated device, means connecting it to the stem to turn the same, and an indicating pointer which is moved by said gear wheel.

6. The combination with a conduit through which a fluid to be metered flows, of a pressure difference creating device in the conduit, a U-tube manometer connected thereto, an indicating fluid therein, a float which rides on the fluid and is raised and lowered vertically thereby according to the pressure difference set up by said pressure difference creating device, an indicating pointer, means for transmitting the vertical movements of the float to said pointer, and means for modifying the movement of the pointer to correct for variations in a condition of the fluid being metered.

7. The combination with a conduit through which a fluid to be metered flows, of a pressure difference creating device in the conduit, a U-tube manometer connected thereto, an indicating fluid therein, a float which rides on the fluid and is raised and lowered vertically thereby according to the pressure difference set up by said pressure difference creating device, an indicating pointer, means for transmitting the vertical movements of the float to said pointer, and means for modifying the movement of the pointer to correct for variations in the pressure of the fluid being metered.

8. The combination with a conduit through which a fluid to be metered flows, of a pressure difference creating device in the conduit, a U-tube manometer connected thereto, an indicating fluid therein, a float which rides on the fluid and is raised and lowered vertically thereby according to the pressure difference set up by said pressure difference creating device, a stem on the float, an indicating pointer, means for transmitting the vertical movement of the float and stem to the pointer, means actuated by the pressure of the fluid being metered for turning the float and stem, and means for transmitting said turning movement to the indicating pointer to correct for variations in a condition of the fluid being metered.

9. The combination with a conduit through which a fluid to be metered flows, of a pressure difference creating device in the conduit, a U-tube manometer connected thereto, an indicating fluid therein, a float which rides on the fluid and is raised and lowered vertically thereby according to the pressure difference set up by said pressure difference creating device, a stem on the float having a thread thereon, a gear wheel with which said thread meshes, an indicating pointer operatively connected to the gear wheel, said thread acting as a rack to turn the gear wheel when the float moves vertically, a device responsive to a condition of the fluid being metered, and means connecting it to the stem to turn it whereby said thread will act as a worm to turn the gear wheel.

10. The combination with a conduit through which a fluid to be metered flows, of a pressure difference creating device in the conduit, a U-tube manometer connected thereto, an indicating fluid therein, a float which rides on the fluid and is raised and lowered vertically thereby according to the pressure difference set up by said pressure difference creating device, a stem on the float having a thread thereon, a gear wheel with which said thread meshes, an indicating pointer operatively connected to the gear wheel, said thread acting as a rack to turn the gear wheel when the float moves vertically, a device responsive to the pressure of the fluid being metered, and means connecting it to the stem to turn it whereby said thread will act as a worm to turn the gear wheel.

11. In a flow meter, the combination of a U-tube, an indicating fluid therein, a float which rides thereon, a stem on the float having a thread thereon, a gear wheel with which the thread meshes, an indicating pointer connected to the gear wheel, the thread on the stem acting as a rack to turn the gear wheel when the float moves vertically due to changes in the level of the indicating fluid, a second gear wheel for imparting a turning movement to the stem whereby said thread acts as a worm to turn the first named gear wheel, a rack engaging the second gear wheel, and means responsive to a condition of the fluid being metered for moving the rack.

In witness whereof I have hereunto set my hand this 13th day of March, 1917.

CHARLES F. BULLOCK.